(12) United States Patent
Grabner et al.

(10) Patent No.: US 7,525,960 B2
(45) Date of Patent: Apr. 28, 2009

(54) METHODS AND SYSTEMS PREVENTING FRAME MIS-ORDERING IN EXPLICITLY ROUTED NETWORKS

(75) Inventors: Steve Joseph Grabner, Ottawa (CA); Byoung-Joon Lee, Nepean (CA); John Willem Van Gulik, Nepean (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 575 days.

(21) Appl. No.: 10/140,997

(22) Filed: May 9, 2002

(65) Prior Publication Data

US 2003/0210693 A1 Nov. 13, 2003

(51) Int. Cl.
*H04L 12/28* (2006.01)
(52) U.S. Cl. .................... 370/389; 370/226; 370/242
(58) Field of Classification Search .................. None
See application file for complete search history.

(56) References Cited

U.S. PATENT DOCUMENTS

| | | | | |
|---|---|---|---|---|
| 5,590,122 | A | * | 12/1996 | Sandorfi et al. ............. 370/394 |
| 6,668,290 | B1 | * | 12/2003 | Nelson ......................... 710/52 |
| 2003/0039250 | A1 | * | 2/2003 | Nichols et al. .............. 370/394 |

OTHER PUBLICATIONS

Lan/Man Standards Committee of the IEEE Computer Society; Information Technology-Telecommunications and Information Exchange Between Systems-Local Metropolitan Area Networks-Common Specifications-Part 3: Media Access Control (MAC) Bridges; ISO/IEC 15802-3: 1998, ANSI/IEEE Std 802.1D, 1998 Edition, pp. 1-375.

Lan/Man Standards Committee of the IEEE Computer Society; IEEE Standard for Local and Metropolitan Area Networks-Common Specifications-Part 3: Media Access Control (MAC) Bridges-Amendment 2: Rapid Reconfiguration, IEEE Std 802.1w-2001, pp. 1-116.

Augustyn, Waldemar; Heron, Giles; Kompella, Vach; Lasserre, Marc; Menezes, Pascal; Ould-Brahim, Hamid; Senevirathne, Tissa; Requirements for Virtual Private Lan Services (VPLS), PPVPN Working Group, Internet Draft, Mar. 2002, pp. 1-15.

* cited by examiner

*Primary Examiner*—Bob A Phunkulh
(74) *Attorney, Agent, or Firm*—Victoria Donnelly

(57) ABSTRACT

Methods, systems and apparatus are provided which prevent frame mis-ordering in an explicitly routed network when switching from a first path to a second path. In a first embodiment, last frame and first frame markers are transmitted, and a receiver buffers all frames received between receipt of the last frame marker and the first frame marker. In a second embodiment, a last frame marker is sent to which an acknowledgement must be received before transmitting on the second path. In a third embodiment, only a first frame marker is sent. The receiver, upon receipt, signals a network card for the first path to stop forwarding frames, also buffers frames for some period. In a fourth embodiment, the merge point node forwards frames over different paths with unique markings so the outgoing card can distinguish them.

23 Claims, 8 Drawing Sheets

METHODS AND SYSTEMS PREVENTING FRAME MIS-ORDERING IN EXPLICITLY ROUTED NETWORKS

FIELD OF THE INVENTION

The invention relates to frame delivery in explicitly routed networks.

BACKGROUND OF THE INVENTION

Some LAN (Local Area Network) application protocols, for example, DECnet LAT (Local Area Transport), IEEE LLC2 (Logical Link Control type 2), NetBios (NETwork Basic Input Output System), IBM SNA (Systems Network Architecture), are built on the assumption that the underlying network does not mis-order frames. As a result, even a low incidence of frame mis-ordering could result in perceived problems in networks that support these application protocols. For this reason, the IEEE 802.1D bridging standard specification explicitly forbids frame duplication and mis-ordering.

This requirement is relevant to the transparent LAN service that can be considered as an extended LAN to the end customers. Frame mis-ordering is particularly likely under network link or node failure conditions where rapid failure protection (e.g., under 50 ms) can be achieved through the use of explicitly routed paths such as MPLS (Multi Protocol Label Switching) traffic engineering LSPs (Label Switched Paths). In such a case, the perceived period of performance degradation of end-user applications due to frame mis-ordering—even a small amount—can be significantly longer than the actual restoration time of the network connectivity.

Systems and methods to prevent frame mis-ordering are required to deal with this situation.

SUMMARY OF THE INVENTION

One broad aspect of the invention provides a method of performing frame forwarding from a path diverge point to a path merge point for an explicitly routed connection comprising:

at the path diverge point:

a) forwarding frames over a first tunnel LSP, the frames including a last frame;

b) marking the last frame transmitted over the first tunnel LSP with an LF (last frame) marker;

c) switching from the first tunnel LSP to a second tunnel LSP;

d) transmitting frames over the second tunnel LSP including a first frame;

e) marking the first frame transmitted over the second tunnel LSP is marked with a FF (first frame) marker;

at the path merge point:

f) upon receipt of the FF marker, if the LF marker has not already been received, discard or buffer all frames until the LF marker is received.

Another broad aspect of the invention provides a system adapted to perform frame forwarding from a path diverge point to a path merge point for an explicitly routed connection, the system comprising:

a first node containing the path diverge point, the first node being adapted to forwarding frames over a first tunnel LSP, the frames including a last frame, marking the last frame transmitted over the first tunnel LSP with an LF (last frame) marker, switch from the first tunnel LSP to a second tunnel LSP, transmit frames over the second tunnel LSP including a first frame, and mark the first frame transmitted over the second tunnel LSP is marked with a FF (first frame) marker;

a second network node containing the path merge point, the second network node being adapted to, upon receipt of the FF marker, if the LF marker has not already been received, discard or buffer all frames until the LF marker is received.

Another broad aspect of the invention provides a network node comprising:

a user card adapted to receive frames;

a first network card connected to a first outgoing tunnel LSP;

a second network card connected to a second outgoing tunnel LSP;

a switching matrix connecting the user card to the first and second network cards;

the user card being adapted to forward received frames to the first network card for forwarding over the first outgoing tunnel LSP, the frames including a last frame, the user card marking the last frame transmitted over the first tunnel LSP with an LF (last frame) marker;

the user card being adapted to switch from the first tunnel LSP to a second tunnel LSP, and thereafter forward received frames to the second network card for forwarding over the second outgoing LSP, the user card marking the first frame transmitted over the second tunnel LSP is marked with a FF (first frame) marker.

Another broad aspect of the invention provides a network node comprising:

a user card adapted to transmit frames;

a first network card connected to a first incoming tunnel LSP adapted to forward frames to the user card;

a second network card connected to a second incoming tunnel LSP adapted to forward frames to the user card;

a switching matrix connecting the user card to the first and second network cards adapted to forward frames to the user card;

the user card being adapted to examine frames forwarded by the first or second network card for a FF marker and an LF marker, and upon receipt of the FF marker prior to receipt of an LF marker, to discard or buffer all frames until the LF marker is received.

Another broad aspect of the invention provides a method of performing frame forwarding from a path diverge point to a path merge point for an explicitly routed connection comprising:

at the path diverge point:

a) forwarding frames over a first tunnel LSP, the frames including a last frame;

b) marking the last frame transmitted over the first tunnel LSP with an LF (last frame) marker;

c) waiting for an acknowledgement frame in response to the frame marked with the LF marker;

d) switching from the first tunnel LSP to a second tunnel LSP;

e) upon receipt of the acknowledgement transmitting frames over the second tunnel LSP;

at a node containing the path merge point:

f) receiving frames over the first tunnel LSP;

g) upon receipt of this LF marker, transmitting back an acknowledgement frame;

h) subsequently receiving frames over the second tunnel LSP.

Another broad aspect of the invention provides a system adapted to perform frame forwarding from a path diverge point to a path merge point for an explicitly routed connection, the system comprising:

a first node containing the path diverge point, the first node being adapted to forwarding frames over a first tunnel LSP, the frames including a last frame, marking the last frame transmitted over the first tunnel LSP with an LF (last frame) marker, wait for an acknowledgement to the frame with the LF marker and then switch from the first tunnel LSP to a second tunnel LSP and begin transmitting frames over the second tunnel LSP;

a second network node containing the path merge point, the second network node being adapted to, upon receipt of the FF marker, transmit an acknowledgement of receipt of the FF marker.

Another broad aspect of the invention provides a network node comprising:

a user card adapted to receive frames;

a first network card connected to a first outgoing tunnel LSP;

a second network card connected to a second outgoing tunnel LSP;

a switching matrix connecting the user card to the first and second network cards;

the user card being adapted to forward received frames to the first network card for forwarding over the first outgoing tunnel LSP, the frames including a last frame, the user card marking the last frame transmitted over the first tunnel LSP with an LF (last frame) marker;

the user card being adapted to wait for an acknowledgement to the LF marker and then switch from the first tunnel LSP to a second tunnel LSP, and thereafter forward received frames to the second network card for forwarding over the second outgoing LSP.

Another broad aspect of the invention provides a network node comprising:

a user card adapted to transmit frames;

a first network card connected to a first incoming tunnel LSP adapted to forward frames to the user card;

a second network card connected to a second incoming tunnel LSP adapted to forward frames to the user card;

a switching matrix connecting the user card to the first and second network cards adapted to forward frames to the user card;

the first network card being adapted to examine incoming frames for a frame containing a FF marker, and upon receipt of such a frame send an acknowledgement of a FF marker back to a starting point of the first LSP.

Another broad aspect of the invention provides a method of performing frame forwarding from a path diverge point to a path merge point for an explicitly routed connection comprising:

at the path diverge point:

a) forwarding frames over a first tunnel LSP interconnecting the path diverge point and the path merge point, the frames including a last frame;

b) switching from the first tunnel LSP to a second tunnel LSP interconnecting the path diverge point and the path merge point;

c) transmitting frames over the second tunnel LSP including a first frame;

d) marking the first frame transmitted over the second tunnel LSP is marked with a FF (first frame) marker;

at the path merge point:

e) receiving frames over the first tunnel LSP and forwarding them on to an output port;

f) upon receipt of the FF marker over the second tunnel LSP, signalling a network card for the first tunnel LSP to stop forwarding frames to the output port;

g) receiving frames over the second tunnel LSP and buffering these frames after the FF marker is received for a period long enough for the signalling of the network card for the first tunnel LSP to be completed.

Another broad aspect of the invention provides a system adapted to perform frame forwarding from a path diverge point to a path merge point for an explicitly routed connection, the system comprising:

a first node containing the path diverge point, the first node being adapted to forwarding frames over a first tunnel LSP, switch from the first tunnel LSP to a second tunnel LSP, transmit frames over the second tunnel LSP including a first frame, and mark the first frame transmitted over the second tunnel LSP is marked with a FF (first frame) marker;

a second network node containing the path merge point, the second node being adapted to upon receipt of the FF marker over the second tunnel LSP, signal a network card for the first tunnel LSP to stop forwarding frames to an output port, and to receive frames over the second tunnel LSP and buffer these frames after the FF marker is received for a period long enough for the signalling of the network card for the first tunnel LSP to be completed.

Another broad aspect of the invention provides a network node comprising:

a user card adapted to receive frames;

a first network card connected to a first outgoing tunnel LSP;

a second network card connected to a second outgoing tunnel LSP;

a switching matrix connecting the user card to the first and second network cards;

the user card being adapted to forward received frames to the first network card for forwarding over the first outgoing tunnel LSP, the user card being adapted to switch from the first tunnel LSP to a second tunnel LSP, and thereafter forward received frames to the second network card for forwarding over the second outgoing LSP, the user card marking the first frame transmitted over the second tunnel LSP is marked with a FF (first frame) marker.

Another broad aspect of the invention provides a network node comprising:

a user card adapted to transmit frames;

a first network card connected to a first incoming tunnel LSP adapted to forward frames to the user card;

a second network card connected to a second incoming tunnel LSP adapted to forward frames to the user card;

a switching matrix connecting the user card to the first and second network cards adapted to forward frames to the user card;

the second network card being adapted to examine frames forwarded over the second tunnel LSP for a FF marker, and upon receipt of the FF marker to signal the first network card to stop forwarding frames to the user card, and to buffer frames long enough for the signalling to be completed and then start forwarding frames to the user card.

Another broad aspect of the invention provides a method of performing frame forwarding from a path diverge point to a path merge point for an explicitly routed connection comprising:

at the path diverge point:

a) forwarding frames over a first tunnel LSP interconnecting the path diverge point and the path merge point, the frames;

c) switching from the first tunnel LSP to a second tunnel LSP interconnecting the path diverge point and the path merge point;

d) transmitting frames over the second tunnel LSP;

at the path merge point:

e) receiving frames over said first tunnel LSP at a first network port, amending the frames to have a first marker, and forwarding the frames thus amended towards an output port;

e) receiving frames over said second tunnel LSP at a second network port, amending the frames to have a second marker different from said first marker, and forwarding the frames thus amended towards said output port;

f) the output port receiving frames from the first network port with said first marker and forwarding these on through the output port;

g) the output port upon receipt of a first frame from the second network port with said second marker, forwarding the frame on through the output port and filtering out all frames with the first marker for a period of time, and then continuing to receive frames from the second network port with said second marker and to forward these frames on through the output port.

In some embodiments, forwarding frames over the first tunnel LSP comprises at the path diverge point receiving frames at an input port, adding a respective tunnel LSP label of the first tunnel LSP and switching them to a respective output port for the first tunnel LSP;

forwarding frames over the second tunnel LSP comprises at the path diverge point receiving frames at the input port, adding a respective tunnel LSP label of the second tunnel LSP and switching them to a respective output port for the second tunnel LSP.

In some embodiments, the method further comprises:

in a network comprising a plurality of explicitly routed connections, configuring on a connection by connection basis either to prevent mis-ordering of frames by performing steps a) to g), or to allow a maximum possible number of frames to be delivered by not performing the steps a) to g).

In some embodiments, the method further comprises establishing said first tunnel LSP as a reduced constraint path, and establishing said second tunnel LSP as a fully constrained path.

In some embodiments, the method further comprises:

rerouting an original connection which has failed to use said first tunnel LSP which is the reduced constraint path to allow a quick restoration of service;

subsequently switching to the second tunnel LSP which is the fully constrained path, using steps a) through g) to avoid mis-ordering of frames.

In some embodiments, the method further comprises:

adding new links to be made available for routing frames;

rerouting frames from using the first tunnel LSP which uses at least one congested link to the second tunnel LSP which use at least one new link using steps a) through g) to avoid mis-ordering of frames.

In some embodiments, the method further comprises:

in order to perform maintenance on an interface card, requesting each path using that interface card to be re-routed to the second tunnel LSP, using steps a) through g) to avoid mis-ordering of frames.

In some embodiments, the method further comprises:

receiving a request for a change in a service parameter for the connection which necessitates switching to a different tunnel LSP, said second tunnel LSP being the different tunnel LSP, and using steps a) through g) to avoid mis-ordering of frames.

Another broad aspect of the invention provides a system adapted to perform frame forwarding from a path diverge point to a path merge point for an explicitly routed connection, the system comprising:

a first node containing the path diverge point, the first node being adapted to forwarding frames over a first tunnel LSP, switch from the first tunnel LSP to a second tunnel LSP, and thereafter transmit frames over the second tunnel LSP;

a second network node containing the path merge point, the second network node being adapted to:

receive frames over a first tunnel LSP at a first network port, amend the frames to have a first marker, and forward the frames thus amended towards an output port; and receive frames over a second tunnel LSP at a second network port, amend the frames to have a second marker different from said first marker, and forward the frames thus amended towards said output port;

the output port of the second network node being adapted to:

receive frames from the first network port with said first marker and forward these on through the output port;

upon receipt of a first frame from the second network port with said second marker, forward the frame on through the output port and filter out all frames with the first marker for a period of time, and then continue to receive frames from the second network port with said second marker and to forward these frames on through the output port.

Another broad aspect of the invention provides a network node comprising:

a user card adapted to transmit frames;

a first network card connected to a first incoming tunnel LSP adapted to forward frames received over a first tunnel LSP towards the user card after marking each with a first marker;

a second network card connected to a second incoming tunnel LSP adapted to forward frames received over a second tunnel LSP towards the user card after marking each with a second marker;

a switching matrix connecting the user card to the first and second network cards adapted to forward frames to the user card;

the user card being adapted to examine frames forwarded by the first or second network card for said first and second marker, and upon receipt of the frame having said second marker, to discard all further frames containing the first marker for a period of time.

In some embodiments, said first and second marker comprise two consecutive markers of a circular sequence of reusable markers.

BRIEF DESCRIPTION OF THE DRAWINGS

Preferred embodiments of the invention will now be described in further detail with reference to the attached drawings in which.

DETAILED DESCRIPTION OF THE PREFERRED EMBODIMENTS

Figure 1:
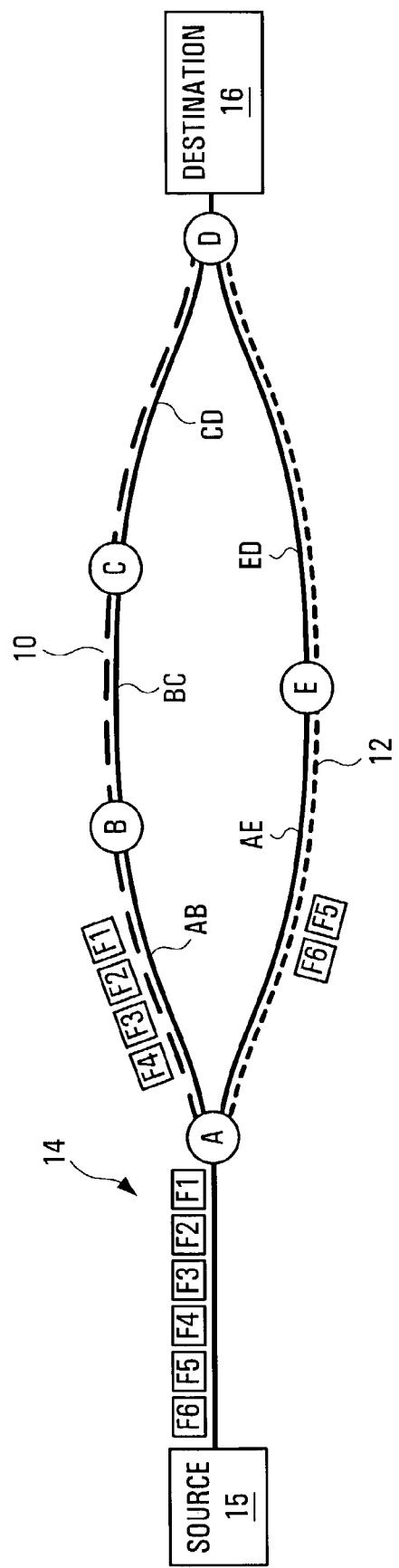
FIGS. 1 and 2 are schematic diagrams of an explicitly routed network illustrating how frame mis-ordering may occur after a path switch.

Referring now to FIG. 1, the frame mis-ordering problem will be illustrated by way of example. Shown is an explicitly routed network having five interconnected nodes A,B,C,D and E with link AB connecting nodes A and B, link BC connecting nodes B and C, link CD connecting node C and D, link AE connecting nodes A and E, and link ED connecting nodes E and D. A first path 10 connects nodes A and D through nodes B and C, and a second path 12 connects nodes A and D through node E. A sequence of frames 14 is shown entering node A from a source 15 for delivery to node D and then to destination 15. In the illustrated example, only six frames F1, F2, F3, F4, F5 and F6 are shown with F1 arriving at node A first, although it would usually be the case that these are part of a larger flow of frames. Node A contains a diverge point for the two paths 10, 12, and node D contains a merge point for the two paths.

Initially, the first path 10 is used to transmit the frames from node A to node D, and the first four frames F1, F2, F3 and F4 are shown on their way to node D along this path. After the transmission of frame F4 on the first path 10, but before the transmission of the next frame F5, a switch/re-direct to the second path 12 is assumed to have occurred. There are a number of circumstances under which this may occur some of which are detailed below. This means that subsequent frames to be delivered from node A to node D will follow the second path 12. Frames F5 and F6 are shown on their way to node D along this path.

Figure 2:
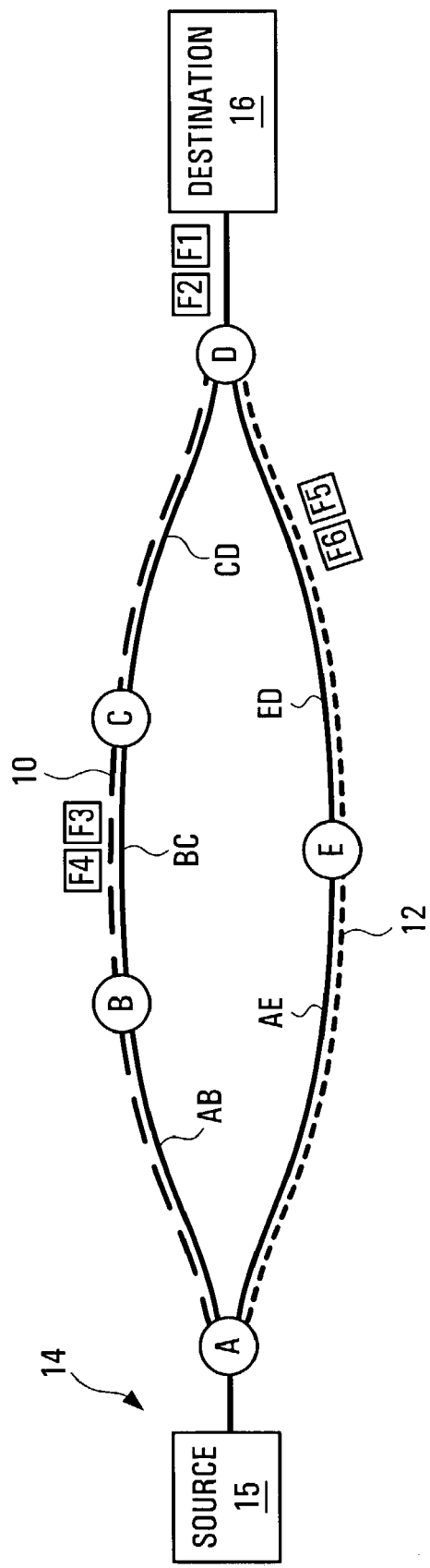

FIG. 2 depicts the same explicitly routed network of FIG. 1 at a later time instant, after frames F1 and F2 have been received over path 10 by node D and dispatched to the destination 16 which may for example be a higher layer protocol running on the node D, or may be running on a separate platform. Also shown are frames F3 and F4 on their way to node D over path 10, and frames F5 and F6 arriving at node D over path 12. Because path 12 may be shorter than path 10, or may be more efficient in delivering frames, it is possible that one or more of the frames F5 and F6 will arrive at node D before one or more of frames F3 and F4. Assuming that node D just forwards all frames it receives on to the destination 16, it is possible therefore that there will be a mis-ordering of frames delivered to the destination 16 and this may cause serious problems at the destination in the event it is not designed to handle such mis-ordering of frames. For example, some applications may crash, drop a connection altogether, and in any case may cause a long service outage. It is noted that source 15 and destination 16 are the source and destination of frames from the perspective of the network being considered. They may not necessarily be the final source or destination for the frames.

Figure 3:
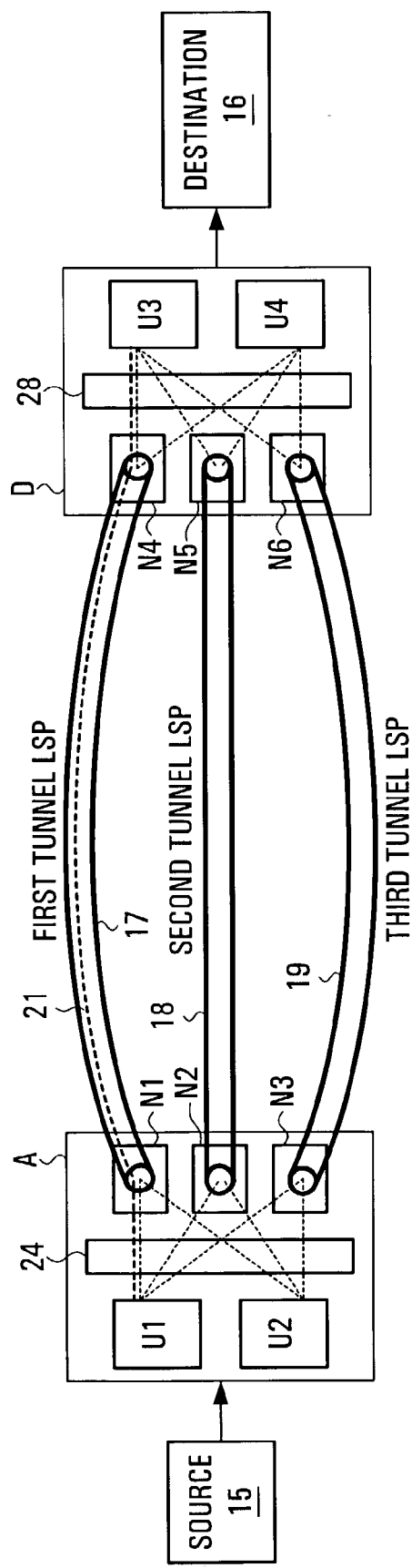
FIG. 3 illustrates details of the network nodes of FIGS. 1 and 2.

Further details of these paths and of nodes A and D are shown in FIG. 3 where only nodes A and D are shown, and the details of the intervening network hidden. Node A is shown to have a plurality (only two shown) of user cards, U1 and U2, a switching matrix 24, and a plurality (only three shown) of network cards N1, N2 and N3. Typically there would be some large number of network cards on the network side of the switching matrix 24. Frames received through any user card can be routed to any of the network cards with the switching matrix 24. Both network and user cards usually support a number of ports which in turn can support more than one LSP connection. Similarly, node D is shown to have a plurality (three shown) of network cards N4, N5 and N6 connected through a switching matrix 28 to a plurality (two shown) of user cards U3 and U4.

In order for efficient switching through the network, hierarchical LSPs are defined, and hierarchical labelling is employed that allows network elements other then those terminating the lowest level LSP to ignore the lowest level LSP label. LSPs which contain other LSPs hierarchically will be referred to as tunnel LSPs. Some LSPs through the network connect a first user card to a second user card. For example, to transmit frames from the source application 15 to the destination application 16, a lowest level LSP 21 from U1 to U3 is defined. Frames being transmitted on this LSP will have an associated LSP label. A tunnel LSP may be defined between network card N1 on node A and network card N4 on node D. Then, frames received at U1 are labelled with a first LSP label for the LSP from U1 to U3, and with a second LSP label for the tunnel LSP from N1 to N4. U1 must be aware of this hierarchy when processing incoming frames from the source 15. Switching in the switching matrix 24 of the first node A and the switching matrix 28 of the second node D is done on the basis of the lowest level LSP label. In the remainder of the network, switching through the network is done using the tunnel LSP label. At the second node D, the tunnel LSP label is stripped off by network card N4 because it is no longer needed to route the frames to the appropriate user card.

In the illustrated example, there are three tunnel LSPs 17, 18, 19 shown between node A and node D. The first path 10 of FIG. 1 employs LSP 21 and tunnel LSP 17. When a switch in path occurs, for example upon occurrence of a failure in a resource used in the first tunnel LSP 17, this may involve switching to a different tunnel LSP, but with no change in the lower level LSP 21. Thus, for example, where the first tunnel LSP 17 was originally used for the LSP, a switch to the second tunnel LSP 18 may be performed. The second path 12 of FIG. 1 may for example employ LSP 21 and tunnel LSP 18. This involves informing the user card U1 to start using a different tunnel level LSP label. No change is required throughout the remainder of the network, and in particular no change is required at the second node D, since it still performs its switching on the basis of the lower level LSP label. When such a switch occurs, in conventional systems, the user card U3 has no way of knowing that the tunnel LSP being used has changed and as such the potential for mis-ordered frames exists. In this example, user card U1 in node A contains the path diverge point, and user card U3 of node D contains the path merge point.

Similarly, in the event the second tunnel LSP 18 is a reduced constraint path, and the third tunnel LSP 19 is a fully constrained path, a subsequent switch from the second tunnel LSP 18 to the third tunnel LSP 19 may also result in the mis-ordering of frames received by the user card U3. This scenario is detailed below under "Two stage re-connect".

According to an embodiment of the invention, to deal with the frame mis-ordering problem, as soon as frames start to be received at a path merge point on a second path after a path redirect/switch from a first path, the frames received from then on over the first path are ignored and discarded. Various mechanisms are provided.

Various embodiments of the invention provide mechanisms of preventing the mis-ordering of frames transmitted by user cards.

First Mechanism

A first mechanism is applicable when a user card performs a switch from using one tunnel LSP to another tunnel LSP in a non-failure scenario. This involves changing the tunnel LSP label. No change to the lowest level LSP is made. In a first mechanism, the last frame transmitted over the first path (such as path 10) is marked with an LF (last frame) marker, and the first frame transmitted over the second path (such as path 12) is marked with a FF (first frame) marker. The LF marker sent on the first path preferably contains the tunnel LSP identifier of the second path, and the FF marker sent on the second path contains the tunnel LSP identifier of the first path. This information is sufficient for a user card to sort out the relationship between the two paths, and determine which path was transmitting first and which path was switched to from which other path. Preferably, the FF and LF markers are sent in separate control frames from data frames which are easily distinguishable from data frames. In another embodiment, a field of a data frame is included which indicates a marker type. However, this would require every data frame be examined.

Upon receipt of the FF marker at the destination user card, if the LF marker has not already been received, in one embodiment the user card begins buffering until it receives the LF marker, and then performs a re-ordering of the frames in a reassembly buffer. This also requires frame sequence numbers to allow the re-ordering to be performed. This avoids any frame loss but requires significant buffering resources. In another embodiment, upon receipt of the FF marker, all frames are discarded until receipt of the LF marker.

Figure 4A:
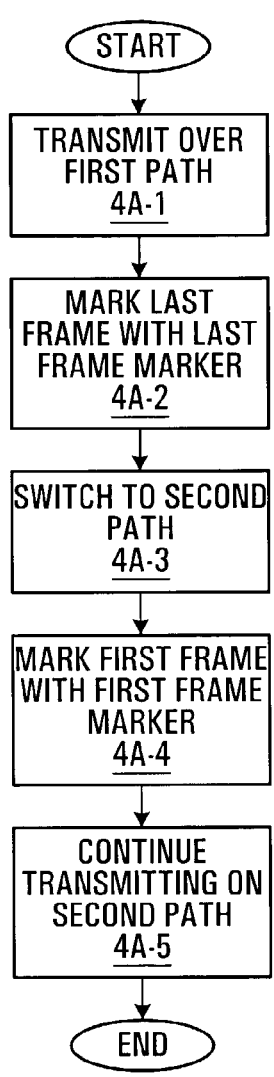
FIGS. 4A and 4B are flowcharts for a method of preventing frame mis-ordering provided by a first embodiment of the invention.

The functionality at the node where the path switch takes place (for example node A of FIGS. 1 and 2) is summarized in the flowchart of FIG. 4A. In step 4A-1, the node is transmitting using the first path, prior to any switch. At step 4A-2, the last frame transmitted using the first path, preferably a separate control frame, is marked with the last frame marker. At step 4A-3, a switch to the second path is made, and at step 4A-4, the first frame sent over the second path, preferably a separate control frame, is marked with the first frame marker. The node then continues transmitting frames on the second path at step 4A-5.

Figure 4B:
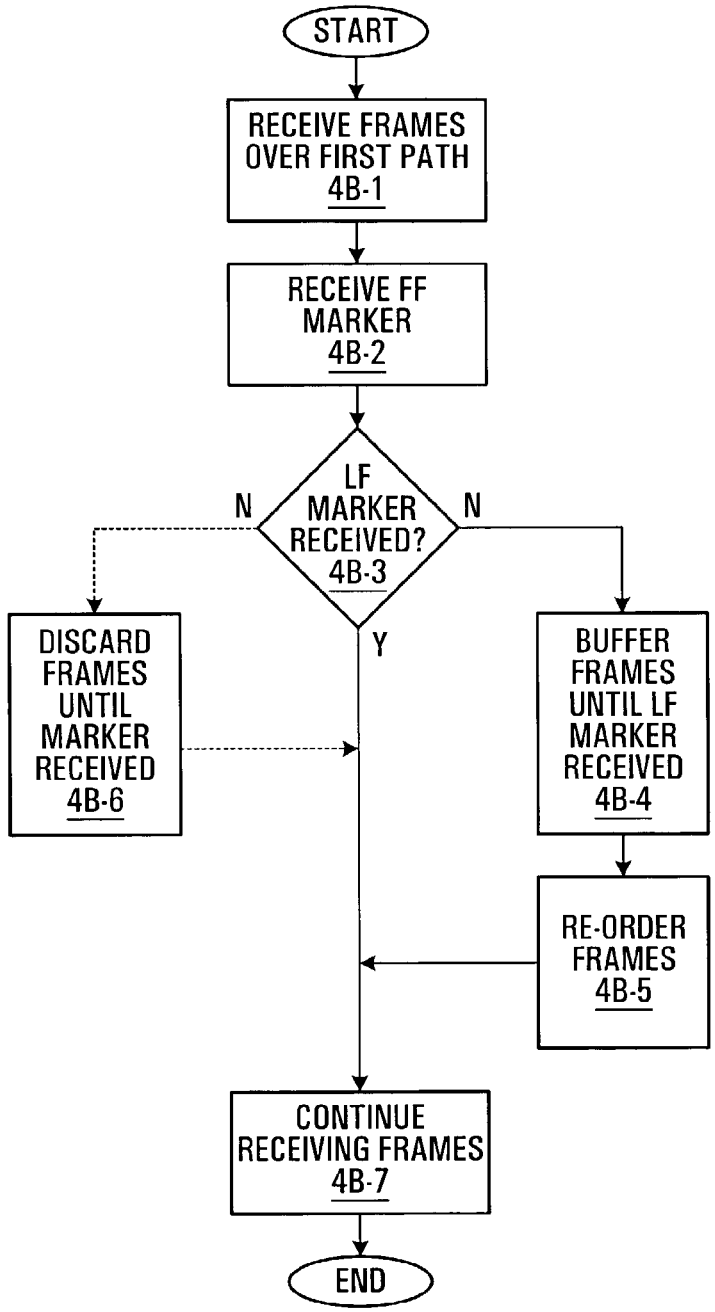

The functionality at the node where the paths merge (for example node D of FIGS. 1 and 2) is summarized in the flowchart of FIG. 4B. Typically, this would be implemented over in the user card. At step 4B-1, the node is receiving frames over the first path. At some point, assuming that a switch in paths is being made, the node will receive a FF marker indicating that the first frame sent over a second path has been received. If the LF marker has already been received (yes path, step 4B-3), then no frame mis-ordering has occurred, and the process simply continues with the receipt of further frames at step 4B-5.

On the other hand, if the LF marker has not yet been received, then in one embodiment at step 4B-4, the node will buffer frames until the LF marker is received after which the frames are re-ordered at step 4B-5 and the process simply continues with the receipt of further frames at step 4B-7. In another embodiment, instead of buffering, frames are discarded at step 4B-6 until the LF marker is received.

Second Mechanism

In a second implementation, the last frame transmitted over the first path is marked with a LF marker. Upon receipt of this LF marker at the second node, the second node transmits back an acknowledgement frame to the first node. This step is executed by the network card terminating the tunnel LSP used for the first path. The first node does not transmit frames on the second path until it receives the acknowledgement frame from the second node.

This mechanism does not require a re-assembly buffer at the receiver. However, it does require the acknowledgement control frame. This may incur a significant performance penalty due to the large delay of the LF frame over the first path. Frame transmission over the new path is delayed by at least one roundtrip delay time.

Figures 5A, 5B:
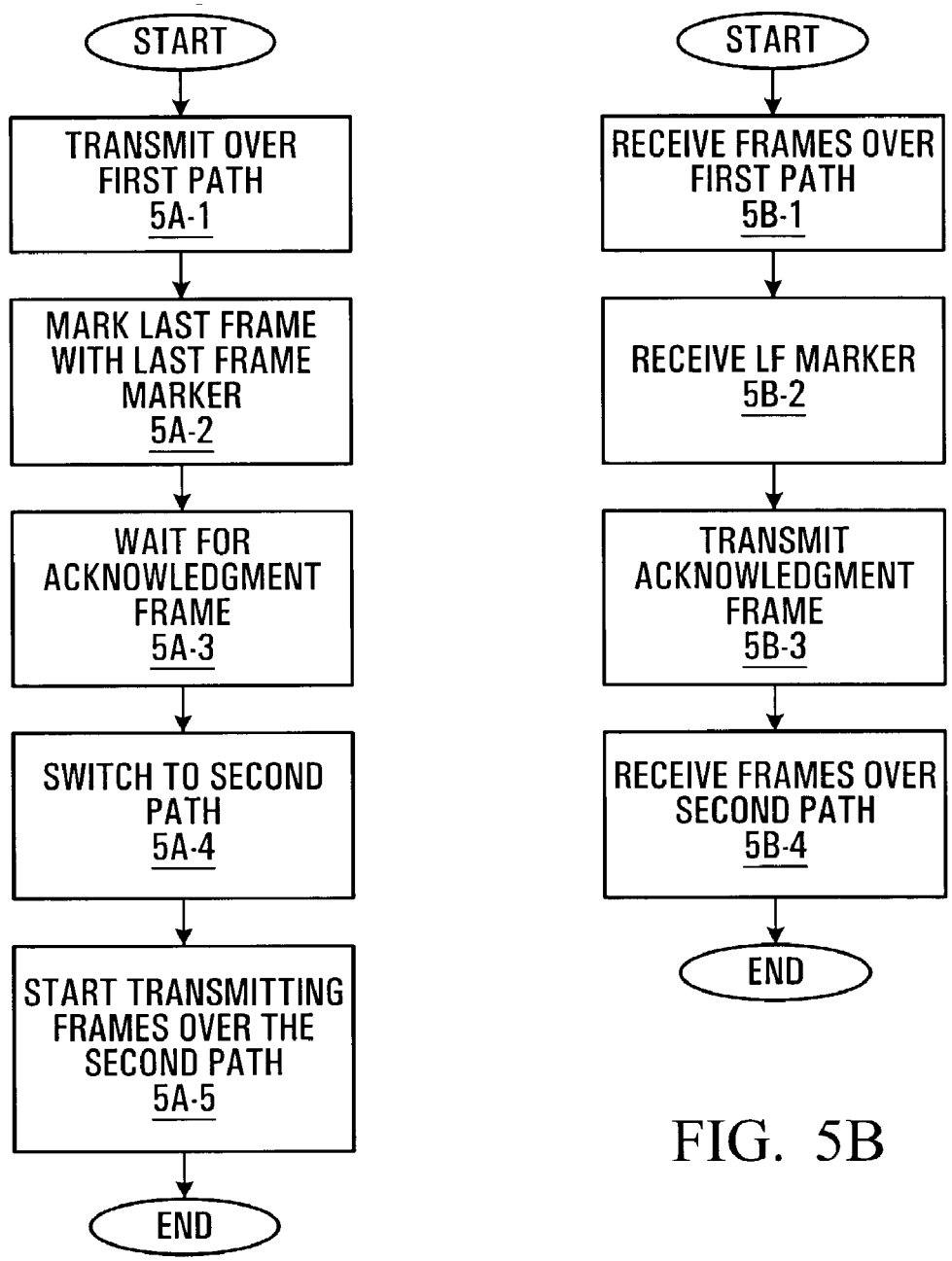
FIGS. 5A and 5B are flowcharts for a method of preventing frame mis-ordering provided by a second embodiment of the invention.

The functionality at the node where the path switch takes place (for example node A of FIGS. 1 and 2) is summarized in the flowchart of FIG. 5A. In step 5A-1, the node is transmitting using the first path, prior to any switch. At step 5A-2, the last frame, preferably a separate control frame, transmitted using the first path is marked with the last frame marker. This is transmitted by the user card terminating the lower level LSP. At step 5A-3, the node waits for an acknowledgement frame from the other end indicating that the last frame marker has been received. At step 5A-4, a switch to the second path is made, and at step 5A-5, node then continues transmitting frames on the second path.

The functionality at the node where the paths merge (for example node D of FIGS. 1 and 2) is summarized in the flowchart of FIG. 5B. At step 5B-1, the node is receiving frames over the first path at a network card terminating the first tunnel LSP. At some point, assuming that a switch in paths is being made, the node will receive a LF marker indicating that the last frame sent over the first path has been received. At step 5B-3, the node, preferably the network card, transmits an acknowledgement frame back to the sender indicating that the LF marker has been received. Then, some time later, the node begins to receive frames over the second path at step 5B-4. Advantageously, no involvement of the user cards whatsoever is required for this embodiment.

Third Mechanism

In another implementation, the first frame transmitted over the second path is sent with a FF (first frame) marker. Transmission is started immediately when the second path is ready. The FF marker in this case carries the LSP identifier of the first path. This should be readily available at the source node.

Then, at the receiver, upon receipt of the FF marker, all further frames received over the first path are dropped. This requires that the network card terminating the tunnel LSP of the second path signal the network card terminating the tunnel LSP for the first path to stop forwarding frames. The network card for the second connection needs to buffer frames received after the FF marker is sent for some period of time long enough to signal the first network card to stop forwarding frames, for example 1 ms.

Figure 6A:
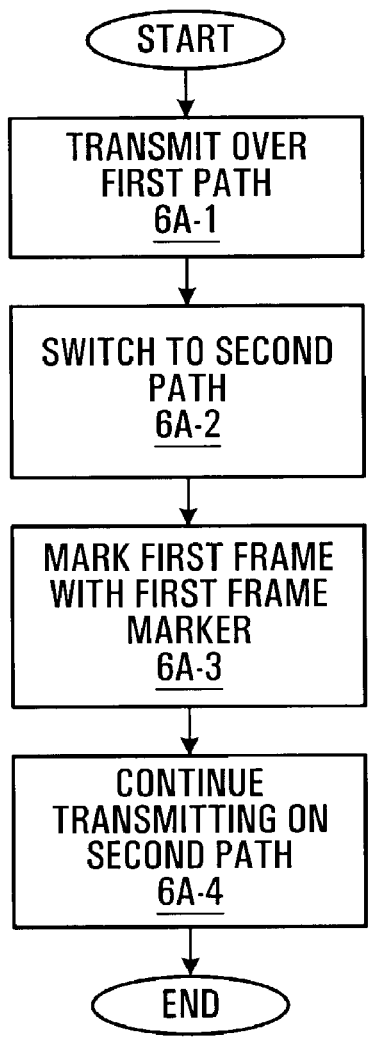
FIGS. 6A and 6B are flowcharts for a method of preventing frame mis-ordering provided by a third embodiment of the invention.

The functionality at the node where the path switch takes place (for example node A of FIGS. 1 and 2) is summarized in the flowchart of FIG. 6A. In step 6A-1, the node is transmitting using the first path, prior to any switch. At step 6A-2, a switch to the second path is made, and at step 6A-3, the first frame sent over the second path is marked with the first frame marker. The node then continues transmitting frames on the second path at step 6A-4. The first frame marker is inserted by the user card which is the source for the lowest level LSP.

Figure 6B:
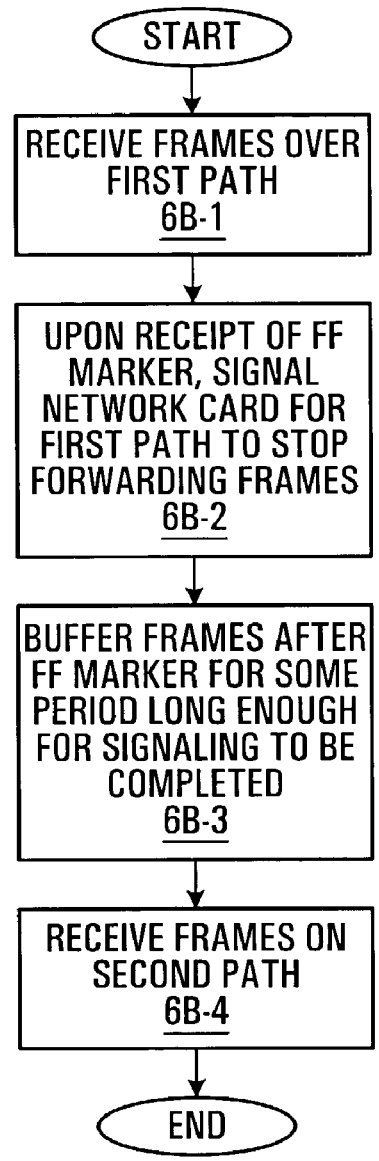

The functionality at the node where the paths merge (for example node D of FIGS. 1 and 2) is summarized in the flowchart of FIG. 6B. At step 6B-1, the node is receiving frames over the first path at the first network card. At some point, assuming that a switch in paths is being made, the node will receive a FF marker at the second network card indicating that the first frame sent over a second path has been received. Upon receipt of this, the first network card for the first path is signaled to stop forwarding frames at step 6B-2. At step 6B-3, the second network card in the node will buffer frames for some period long enough for the signaling to be completed after which the process simply continues with the receipt of further frames at step 6B-4.

Preferably, for a given tunnel LSP the second network card only signals the first network card upon receiving the first FF marker out of potentially many FF markers from respective lowest level LSPs which use the tunnel LSP. Then, the first network card drops all frames for all lowest level LPSs which use the tunnel LSP.

This scheme likely incurs less frame loss due to immediate transmission over the second path. It also is the simplest of the three implementations presented thus far in that it only requires a single control frame.

Fourth Mechanism

Figure 7:
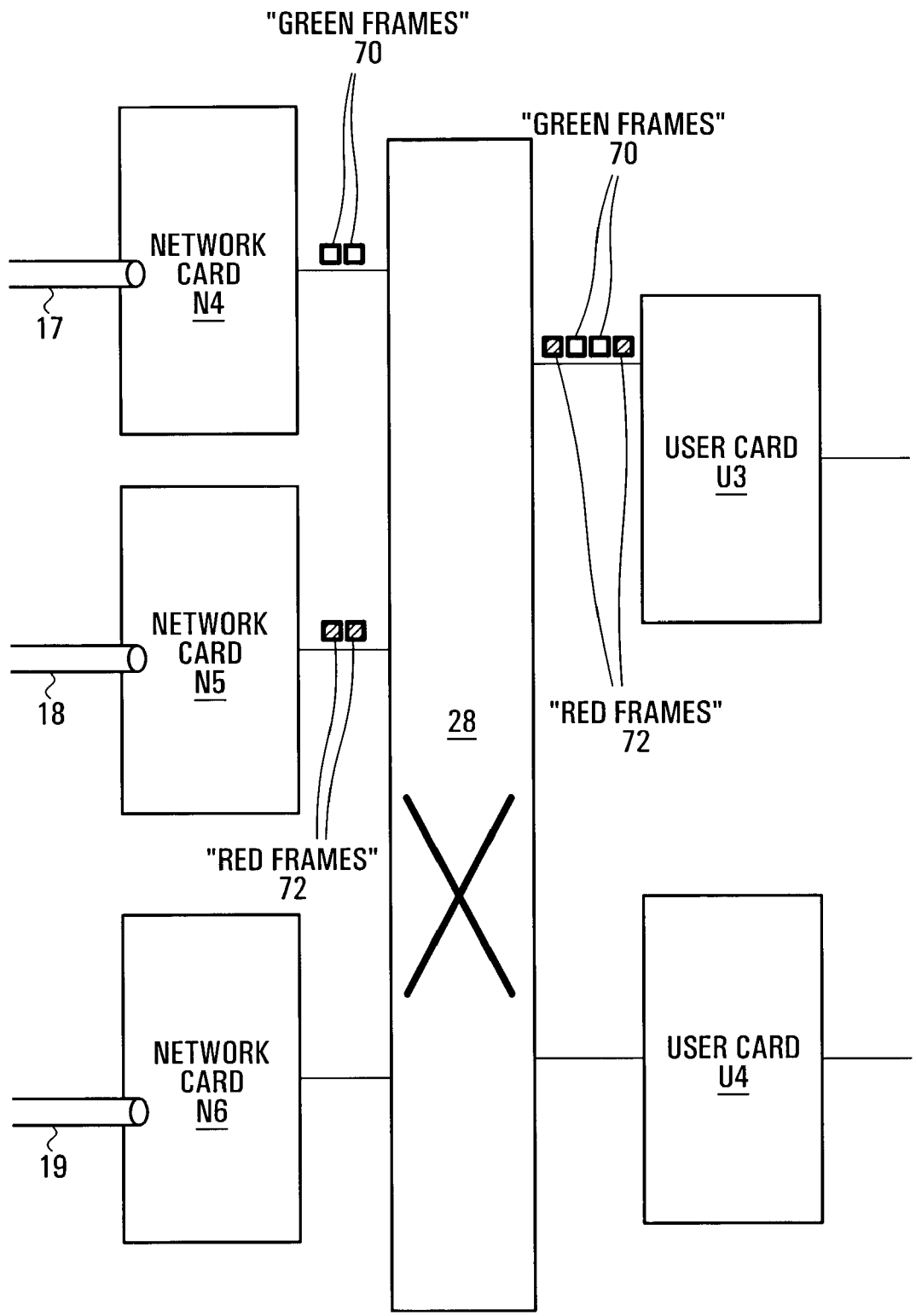
FIG. 7 is a block diagram of a network node adapted to prevent frame mis-ordering by employing a method provided by a fourth embodiment of the invention.

Another implementation will now be described with reference to FIG. 7 which is a block diagram of an end node of two paths. The elements of FIG. 7 are the same as those for node D of FIG. 3, namely three network cards N4, N5, N6 connected to three tunnel LSPs 17, 18, 19, a switching fabric 28, and user cards U3, U4. In this embodiment of the invention, all frames received through the first tunnel LSP 17 at network card N4 are amended to include a first marking. Typically, in a switching arrangement such as shown in FIG. 7, some sort of proprietary header is employed to route the frames from the network cards to the user cards and vice versa. The unique marking may be added to such a proprietary header. Furthermore, all frames received on the second tunnel LSP 18 at the network card N5 are amended to include a second marking different from the first marking.

The user card U3 on an ongoing basis examines the unique marking of each frame received. As soon as a frame is received having the second unique marking, a filtering process is started which prevents frames received having the first unique marking from being transmitted. These frames are simply dropped. This filtering process only needs to be continued for as long as it is still possible to receive frames over the first path.

In one embodiment as illustrated FIG. 7, the unique marking may be considered to be a colour, for example one of red, green, and blue with the colours defining a pre-determined sequence which allows them to be re-used. For example assigning the colours such that green always follows red, blue always follow green, and red always follow blue. The colour is really just an abstract marking. The colour can be implemented as a simple flag or combination of flags. The frames being transmitted from the network card N4 to the user card U3 via the switching fabric 28 are "green frames" 70, and the frames being transmitted from the second network card N5 to the user card U3 via the switching fabric 28 are "red frames" 72.

Advantageously, the fourth mechanism does not require any special control frames for implementation. The sending node simply starts transmitting on the new path whenever it is set up.

Figure 8A:
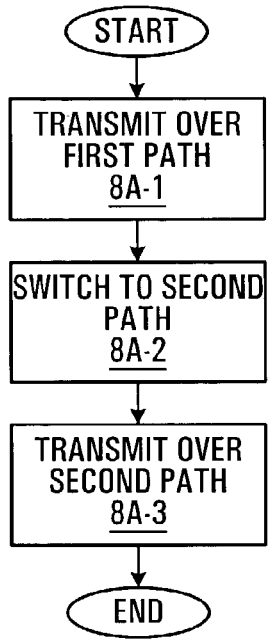
FIGS. 8A, 8B, 8C and 8D are flowcharts for the method of preventing frame mis-ordering provided by the fourth embodiment of the invention.

The functionality at the node where the path switch takes place (for example node A of FIGS. 1 and 2) is summarized in the flowchart of FIG. 8A. In step 8A-1, the node is transmitting using the first path, prior to any switch. At step 8A-2, a switch to the second path is made. The node then continues transmitting frames on the second path at step 8A-3.

Figure 8B:
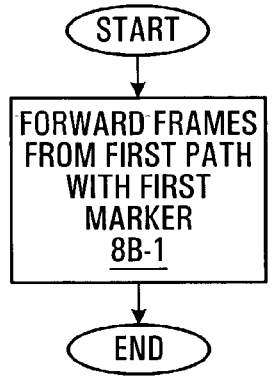
Figure 8C:
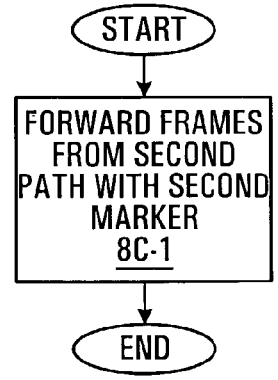
Figure 8D:
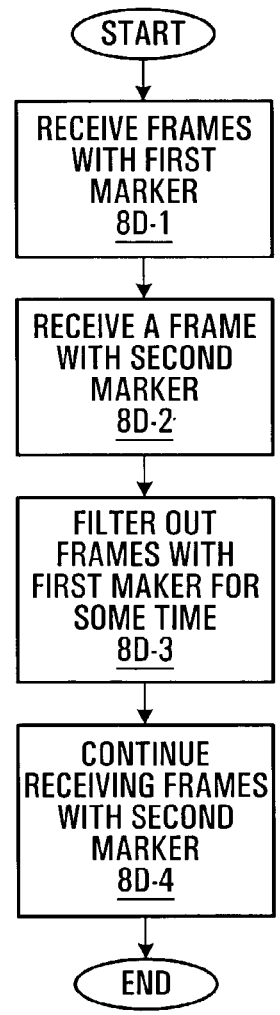

The functionality at the node where the paths merge (for example node D of FIGS. 1 and 2) is summarized in the flowcharts of FIGS. 8B, 8C and 8D. The flowchart of FIG. 8B shows the functionality of the network card terminating the first tunnel LSP, this being simply to forward frames from the first path after adding the first marker to these frames, at step 8B-1. The flowchart of FIG. 8C shows the functionality of the network card terminating the second tunnel LSP, this being simply to forward frames from the second path after adding the second marker to these frames, at step 8C-1.

The functionality of the user card terminating the lower level LSP is summarized in the flowchart of FIG. 8D. At step 8D-1, the user card is receiving frames with the first marker from the first network card. At some point, assuming that a switch in paths is being made, at step 8D-2 the node will receive a frame from the second network card, and the frame will have a second marker different from the first marker. Then, at step 8D-3 for some period of time long enough for the first network card to empty its buffer, the user card filters out (drops) all frames having the first marker. The process simply continues after that with the receipt of further frames with the second marker at step 8D-4.

The above schemes are applicable whenever a controlled re-direct from a first path to a second path occurs. Three specific examples of when this may occur will now be described.

Two Stage Re-Connect

Commonly assigned copending application entitled "Two-Stage Reconnect System and Method" filed Apr. 8, 2002, to Cuong Dang et al., hereby incorporated by reference in its entirety, teaches a two-stage re-connect mechanism whereby after a failure, a connection is re-routed over a reduced constraint path, for example a path constrained as best effort, initially to allow quick re-routing, and then once a fully constrained path has been established the connection is re-routed from the reduced constraint path to the fully constrained path in a controlled fashion. Typically, the reduced constraint path also has inferior performance compared to the fully constrained path which is subsequently set up. This makes the likelihood of frame mis-ordering increase since the delay on the reduced constraint path will likely be longer than that of the fully constrained path.

Partially Constrained to Fully Constrained Redirect

As a more general case of the above described 2-stage reconnect method, the invention may be applied in any scenario requiring a switch from a first reduced constraint (for example best effort) path to a fully constrained path.

Path Optimize

After a layer 2 protection switch due to a network resource failure, some connections may not be following an optimal path. For example, a connection may have protection switched to a high cost link which the user may not wish to continue to use. In this case, the user would request that the connection be optimized to use a lower cost path. When the new optimized path is ready, one of the above discussed mechanisms is used to switch traffic from the non-optimal path to the new path in a controlled fashion to insure that no frame mis-ordering occurs.

A user may add additional links to their network and wish to move some connections of congested links to use the new links. They would request the paths be optimized to use the newly available links. Again, one of the above discussed mechanisms would be used to insure that there is no frame mis-ordering during the traffic switch.

Path Modify

If a user needs to perform maintenance on an interface card, they will need to request all connections using that interface card to be re-routed. After the new paths are set up, one of the above discussed mechanisms may be used to ensure there is no frame mis-ordering during the path switch.

If there is a request for a change in a service parameter for a connection, for example an increase in bandwidth of a given connection, a new path may need to be created to satisfy the request. Again, one of the above discussed mechanisms is used to ensure no frame mis-ordering during the switch to the new path.

In another embodiment of the invention, the option of preventing mis-ordering of frames is implemented as a configurable option on a connection by connection basis. Then, for those connections involving applications which do not have a problem with mis-ordering of frames, the above mechanisms are disabled thereby allowing the maximum number of frames possible to be delivered to the application, whereas for those connections involving applications which do have a problem with mis-ordering of frames, one of the above mechanisms would be enabled.

It is noted that the above described embodiments have assumed that the path out of the second node is through a "user" card in which case the merge point for the two paths occurs at the edge of the network. More generally, the above described mechanisms can be applied at any merge point within a network of two paths between which a switch is to take place. The outgoing path may use another network card, in which case the remainder of the path is common for the two paths.

Numerous modifications and variations of the present invention are possible in light of the above teachings. It is therefore to be understood that within the scope of the appended claims, the invention may be practised otherwise than as specifically described herein.

The invention claimed is:

1. A method of performing frame forwarding from a path diverge point to a path merge point for an explicitly routed connection comprising:
   at the path diverge point:
   a) forwarding a first set of frames over a first tunnel Label Switched Path (LSP);
   b) identifying a last frame transmitted over the first tunnel LSP by marking the last frame transmitted over the first tunnel LSP with an LF (last frame) marker;
   c) switching from the first tunnel LSP to a second tunnel LSP;
   d) transmitting a second set of frames over the second tunnel LSP;
   e) identifying a first frame transmitted over the second tunnel LSP by marking the first frame transmitted over the second tunnel LSP with a FF (first frame) marker; and
   at the path merge point:
   f) upon receipt of the FF marker, if the LF marker has not already been received, discarding or buffering all received frames until the LF marker is received.

2. A system for performing frame forwarding from a path diverge point to a path merge point for an explicitly routed connection, the system comprising:
   a first node containing the path diverge point for forwarding a first set of frames over a first tunnel Label Switched Path (LSP), for marking a last frame transmitted over the first tunnel LSP with an LF (last frame) marker, for switching from the first tunnel LSP to a second tunnel LSP, for transmitting a second set of frames over the second tunnel LSP, and for marking a first frame transmitted over the second tunnel LSP with a FF (first frame) marker; and
   a second network node containing the path merge point, wherein the second network node, upon receipt of the FF marker, if the LF marker has not already been received, discards or buffers all received frames until the LF marker is received.

3. A network node comprising:
   a user card for receiving frames;
   a first network card connected to a first outgoing tunnel Label Switched Path (LSP);
   a second network card connected to a second outgoing tunnel LSP;
   a switching matrix connecting the user card to the first and second network cards;
   wherein the user card forwards received frames to the first network card for forwarding over the first outgoing tunnel LSP, the user card marking a last frame transmitted over the first tunnel LSP with an LF (last frame) marker;
   and wherein the user card switches from the first tunnel LSP to a second tunnel LSP, and thereafter forwards received frames to the second network card for forwarding over the second outgoing LSP, the user card marking a first frame transmitted over the second tunnel LSP with a FF (first frame) marker.

4. A network node comprising:
   a user card;
   a first network card connected to a first incoming tunnel Label Switched Path (LSP) for forwarding a first set of frames to the user card;
   a second network card connected to a second incoming tunnel LSP for forwarding a second set of frames to the user card;
   a switching matrix connecting the user card to the first and second network cards;
   wherein the user card examines frames received from the first or second network card for a FF marker and an LF marker, and, upon receipt of the FF marker prior to receipt of an LF marker, discards or buffers all received frames until the LF marker is received.

5. A method of performing frame forwarding from a path diverge point to a path merge point for an explicitly routed connection comprising:
   at the path diverge point:
   a) forwarding a first set of frames over a first tunnel Label Switched Path (LSP);
   b) marking a last frame transmitted over the first tunnel LSP with an LF (last frame) marker;
   c) waiting for an acknowledgement frame in response to the last frame marked with the LF marker;
   d) switching from the first tunnel LSP to a second tunnel LSP;
   e) upon receipt of the acknowledgement frame transmitting a second set of frames over the second tunnel LSP;
   at a node containing the path merge point:
   f) receiving the first set of frames over the first tunnel LSP;
   g) upon receipt of the LF marker, transmitting back the acknowledgement frame; and
   h) subsequently receiving the second set of frames over the second tunnel LSP.

6. A system for performing frame forwarding from a path diverge point to a path merge point for an explicitly routed connection, the system comprising:
   a first node containing the path diverge point for forwarding a first set of frames over a first tunnel Label Switched Path (LSP), marking a last frame transmitted over the first tunnel LSP with an LF (last frame) marker, waiting for an acknowledgement to the last frame marked with the LF marker, switching from the first tunnel LSP to a second tunnel LSP upon receiving the acknowledgement and beginning transmitting a second set of frames over the second tunnel LSP;

a second network node containing the path merge point, the second network node, upon receipt of a frame with the LF marker, transmits an acknowledgement of receipt of the LF marker.

7. A network node comprising:
a user card for receiving frames;
a first network card connected to a first outgoing tunnel Label Switched Path (LSP);
a second network card connected to a second outgoing tunnel LSP;
a switching matrix connecting the user card to the first and second network cards;
wherein the user card forwards the received frames to the first network card for forwarding over the first outgoing tunnel LSP, and marks a last frame transmitted over the first tunnel LSP with an LF (last frame) marker;
and wherein the user card waits for a receipt of an acknowledgement to the LF marker before switching from the first tunnel LSP to a second tunnel LSP, and forwarding subsequently received frames to the second network card for forwarding over the second outgoing LSP.

8. A network node comprising:
a user card for transmitting frames;
a first network card connected to a first incoming tunnel Label Switched Path (LSP) for forwarding a first set of frames to the user card;
a second network card connected to a second incoming tunnel LSP for forwarding a second set of frames to the user card;
a switching matrix connecting the user card to the first and second network cards;
wherein the first network card examines incoming frames for a frame containing a last frame (LF) marker, and, upon receipt of the frame containing the LF marker, sends an acknowledgement of a LF marker back to a starting point of the first incoming tunnel LSP.

9. A method of performing frame forwarding from a path diverge point to a path merge point for an explicitly routed connection comprising:
at the path diverge point:
a) forwarding a first set of frames over a first tunnel Label Switched Path (LSP) interconnecting the path diverge point and the path merge point;
b) switching from the first tunnel LSP to a second tunnel LSP interconnecting the path diverge point and the path merge point;
c) transmitting a second set of frames over the second tunnel LSP;
d) marking a first frame transmitted over the second tunnel LSP with a FF (first frame) marker;
at the path merge point:
e) receiving the first set of frames over the first tunnel LSP and forwarding them on to an output port;
f) upon receipt of the FF marker over the second tunnel LSP, signaling a network card for the first tunnel LSP to stop forwarding frames to the output port;
g) receiving the second set of frames over the second tunnel LSP and buffering the second set of frames after the FF marker is received for a period long enough for the signaling of the network card for the first tunnel LSP to be completed.

10. A system for performing frame forwarding from a path diverge point to a path merge point for an explicitly routed connection, the system comprising:

a first node containing the path diverge point for forwarding a first set of frames over a first tunnel Label Switched Path (LSP), switching from the first tunnel LSP to a second tunnel LSP, transmitting a second set of frames over the second tunnel LSP, and marking a first frame transmitted over the second tunnel LSP with a FF (first frame) marker; and a second network node containing the path merge point, wherein the second node, upon receipt of the FF marker over the second tunnel LSP, signals a network card for the first tunnel LSP to stop forwarding the first set of frames to an output port, receives the second set of frames over the second tunnel LSP and buffers the second set of frames after the FF marker is received until the signaling of the network card for the first tunnel LSP is completed.

11. A network node comprising:
a user card for receiving frames;
a first network card connected to a first outgoing tunnel Label Switched Path (LSP);
a second network card connected to a second outgoing tunnel LSP;
a switching matrix connecting the user card to the first and second network cards;
wherein the user card forwards received frames to the first network card for forwarding over the first outgoing tunnel LSP, the user card switches from the first tunnel LSP to a second tunnel LSP, and forwards subsequently received frames to the second network card for forwarding over the second outgoing LSP, and the user card marks a first frame transmitted over the second tunnel LSP with a FF (first frame) marker.

12. A network node comprising:
a user card for transmitting frames;
a first network card connected to a first incoming tunnel Label Switched Path (LSP) for forwarding a first set of frames to the user card;
a second network card connected to a second incoming tunnel LSP for forwarding a second set of frames to the user card;
a switching matrix connecting the user card to the first and second network cards;
wherein the second network card examines frames received over the second tunnel LSP for a FF (first frame) marker, and upon receipt of the FF marker signals the first network card to stop forwarding the first set of frames to the user card, buffers the received frames and starts forwarding the second set of frames to the user card once the signaling to the first network card is completed.

13. A method of performing frame forwarding from a path diverge point to a path merge point for an explicitly routed connection comprising:
at the path diverge point:
a) forwarding a first set of frames over a first tunnel Label Switched Path (LSP) interconnecting the path diverge point and the path merge point;
b) switching from the first tunnel LSP to a second tunnel LSP interconnecting the path diverge point and the path merge point;
c) transmitting a second set of frames over the second tunnel LSP;
at the path merge point:
d) receiving the first set of frames over said first tunnel LSP at a first network port, amending the first set of frames by inserting a first marker in each frame of said first set of frames, and forwarding the amended first set of frames towards an output port;

e) receiving the second set of frames over said second tunnel LSP at a second network port, amending the second set of frames by inserting in each frame of said second set of frames a second marker different from said first marker, and forwarding the amended second set of frames towards said output port;

f) the output port receiving the first set of frames from the first network port with said first marker and forwarding the first set of frames with said first marker on through the output port;

g) the output port upon receipt of a first frame from the second network port with said second marker, forwarding the first frame on through the output port, filtering out all received frames with the first marker for a period of time, continuing to receive the second set of frames from the second network port with said second marker and forwarding the second set of frames on through the output port.

14. A method according to claim 13 wherein forwarding the first set of frames over the first tunnel LSP comprises at the path diverge point receiving frames at an input port, adding a respective tunnel LSP label of the first tunnel LSP and switching them to a respective output port for the first tunnel LSP; and wherein forwarding the second set of frames over the second tunnel LSP comprises at the path diverge point receiving frames at the input port, adding a respective tunnel LSP label of the second tunnel LSP and switching them to a respective output port for the second tunnel LSP.

15. A method according to claim 13 further comprising: in a network comprising a plurality of explicitly routed connections, configuring on a connection by connection basis either to prevent mis-ordering of frames by performing steps a) to g).

16. A method according to claim 13 further comprising establishing said first tunnel LSP as a reduced constraint path, and establishing said second tunnel LSP as a fully constrained path.

17. A method according to claim 16 further comprising: rerouting an original connection which has failed to use said first tunnel LSP established as the reduced constraint path to allow a quick restoration of service; subsequently switching to the second tunnel LSP established as the fully constrained path, using steps a) through g).

18. A method according to claim 13 further comprising: adding new links to be made available for routing frames; rerouting frames from using the first tunnel LSP which uses at least one congested link to the second tunnel LSP which use at least one new link using steps a) through g).

19. A method according to claim 13 further comprising: in order to perform maintenance on an interface card, requesting each path using that interface card to be re-routed to the second tunnel LSP, using steps a) through g).

20. A method according to claim 13 further comprising: receiving a request for a change in a service parameter for the connection which necessitates switching to a different tunnel LSP, said second tunnel LSP being the different tunnel LSP, and using steps a) through g).

21. A system for performing frame forwarding from a path diverge point to a path merge point for an explicitly routed connection, the system comprising:

a first node containing the path diverge point, the first node forwarding a first set of frames over a first tunnel Label Switched Path (LSP), switching from the first tunnel LSP to a second tunnel LSP, and thereafter transmitting a second set of frames over the second tunnel LSP;

a second network node containing the path merge point, the second network node receiving the first set of frames over a first tunnel LSP at a first network port, amending the received first set of frames by inserting a first marker in each of the received first set of frames, and forwarding the amended first set of frames towards an output port; the second network node further receiving the second set of frames over the second tunnel LSP at the second network port, amending the second set of frames by inserting in each of the received second set of frames a second marker different from said first marker, and forwarding the amended second set of frames towards said output port;

wherein the output port of the second network node receives the amended first set of frames from the first network port with said first marker and forwards the amended first set of frames on through the output port; upon receipt of a first frame from the second network port with said second marker, forwards the first frame on through the output port and filters out all frames with the first marker for a period of time, and wherein the output port of the second network node continues to receive the amended second set of frames from the second network port with said second marker and to forward the amended second set of frames on through the output port.

22. A network node comprising:

a user card for transmitting frames;

a first network card connected to a first incoming tunnel Label Switched Path (LSP) for forwarding frames received over a first tunnel LSP towards the user card after marking each frame with a first marker;

a second network card connected to a second incoming tunnel LSP for forwarding frames received over a second tunnel LSP towards the user card after marking each frame received over a second tunnel LSP with a second marker;

a switching matrix connecting the user card to the first and second network cards for forwarding frames to the user card;

wherein the user card examines frames forwarded by the first or second network card for said first and second marker, and upon receipt of the frame having said second marker, discards all further frames containing the first marker for a period of time.

23. A network node according to claim 22 wherein said first and second marker comprise two consecutive markers of a circular sequence of reusable markers.

* * * * *